United States Patent
Viswanathan

(10) Patent No.: US 11,579,625 B2
(45) Date of Patent: Feb. 14, 2023

(54) METHOD AND APPARATUS FOR DE-BIASING THE DETECTION AND LABELING OF OBJECTS OF INTEREST IN AN ENVIRONMENT

(71) Applicant: HERE Global B.V., Eindhoven (NL)

(72) Inventor: Anirudh Viswanathan, Berkeley, CA (US)

(73) Assignee: HERE GLOBAL B.V., Eindhoven (NL)

(*) Notice: Subject to any disclaimer, the term of this patent is extended or adjusted under 35 U.S.C. 154(b) by 221 days.

(21) Appl. No.: 17/140,531

(22) Filed: Jan. 4, 2021

(65) Prior Publication Data

US 2021/0124368 A1  Apr. 29, 2021

Related U.S. Application Data

(63) Continuation of application No. 16/210,417, filed on Dec. 5, 2018, now Pat. No. 10,928,831.

(51) Int. Cl.
| | |
|---|---|
| *G05D 1/02* | (2020.01) |
| *G06T 7/12* | (2017.01) |
| *G05D 1/00* | (2006.01) |
| *G06T 7/30* | (2017.01) |
| *G06V 20/58* | (2022.01) |
| *G06V 10/778* | (2022.01) |
| *G01C 21/32* | (2006.01) |

(52) U.S. Cl.
CPC ......... *G05D 1/0251* (2013.01); *G01C 21/32* (2013.01); *G05D 1/0088* (2013.01); *G05D 1/0221* (2013.01); *G06T 7/12* (2017.01); *G06T 7/30* (2017.01); *G06V 10/7788* (2022.01); *G06V 20/582* (2022.01)

(58) Field of Classification Search
None
See application file for complete search history.

(56) References Cited

U.S. PATENT DOCUMENTS

| | | |
|---|---|---|
| 8,442,330 B2 | 5/2013 | Tong |
| 8,811,726 B2 | 8/2014 | Belhumeur |

(Continued)

OTHER PUBLICATIONS

U.S. Appl. No. 16/210,417, filed Dec. 5, 2018, 2020-0183412, Allowed.

(Continued)

*Primary Examiner* — Todd Melton
(74) *Attorney, Agent, or Firm* — Alston & Bird LLP

(57) ABSTRACT

Described herein are methods of generating learning data to facilitate de-biasing the labeled location of an object of interest within an image. Methods may include: receiving sensor data, where the sensor data is a first image; determining reference corner locations of an object in the first image using image processing; generating observed corner locations of the object in the first image from the determined reference corner locations; generating a bias transformation based, at least in part, on a difference between the reference corner locations and the observed corner locations of the object in the first image; receiving sensor data from another image sensor of a second image; receiving observed corner locations of an object in the second image from a user; and applying the bias transformation to the observed corner locations of the object in the second image to generate de-biased corners for the object in the second image.

20 Claims, 6 Drawing Sheets

(56) References Cited

U.S. PATENT DOCUMENTS

| | | |
|---|---|---|
| 9,792,532 B2 | 10/2017 | Cox |
| 2011/0289025 A1 | 11/2011 | Yan et al. |
| 2015/0178639 A1 | 6/2015 | Martin et al. |
| 2018/0165554 A1 | 6/2018 | Zhang et al. |
| 2018/0165697 A1 | 6/2018 | Stolorz |

OTHER PUBLICATIONS

Cabrera, G. F. et al., *Systematic Labeling Bias: De-Biasing Where Everyone is Wrong*, 2014 $22^{nd}$ International Conference on Pattern Recognition, IEE Computer Society (2014) 4417-4422.

Misra, I. et al., *Seeing Through the Human Reporting Bias: Visual Classifiers From Noisy Human-Centric Labels* [online] [retrieved Jan. 31, 2019]. Retrieved from the Internet: <URL: https://arxiv.org/pdf/1512.06974.pdf>. (dated Apr. 12, 2016) 10 pages.

METHOD AND APPARATUS FOR DE-BIASING THE DETECTION AND LABELING OF OBJECTS OF INTEREST IN AN ENVIRONMENT

CROSS-REFERENCE TO RELATED APPLICATIONS

This application is a continuation of and claims priority to U.S. patent application Ser. No. 16/210,417, filed on Dec. 5, 2018, the contents of which are hereby incorporated by reference in their entirety.

TECHNOLOGICAL FIELD

Example embodiments of the present invention relate generally to the detection and labeling of objects in an environment, and more particularly, to removing bias in the labeling of objects in an environment to ensure bias is not perpetuated into automated object detection.

BACKGROUND

Road geometry modelling is very useful for map creation and identification of objects of interest in environments, such as road signs along a road segment. Such object identification may facilitate autonomous vehicle navigation along a prescribed path. Traditional methods for modelling of road geometry and object or feature detection are resource intensive, often requiring significant amounts of human measurement and calculation. Such methods are thus time consuming and costly. Exacerbating this issue is the fact that many modern day applications require the analysis of large amounts of data, and therefore are not practical without quicker or less costly techniques.

Some current methods for road geometry and environment modelling rely upon feature detection from image data to perform object identification, but these methods have deficiencies. For instance, some systems designed for object detection/identification around a vehicle exist, but may be unreliable. Further, the reliability of object detection may not be known such that erroneous object detection or lack of object detection may adversely impact autonomous or semi-autonomous driving. Over-estimating the accuracy of object detection may cause reliability concerns as object locations may be improperly interpreted as accurate when they are actually inaccurate, while under-estimating accuracy may lead to inefficiencies through overly cautious behaviors. Further, map data reconstruction of an environment may be inaccurate if object identification does not properly establish the location of an object in an environment.

BRIEF SUMMARY

Accordingly, a method, apparatus, and computer program product are provided for automatically detecting objects of interest in an environment, and more particularly, for generating training data for a perception system in order to reliably and repeatably remove bias from manually labeled objects in an environment depicted in an image. In a first example embodiment, an apparatus is provided including at least one processor and at least one memory including computer program code. The at least one memory and the computer program code may be configured to, with the at least one processor, cause the apparatus to: receive sensor data from an image sensor, where the sensor data is representative of an observed image; receive observed corner locations of an object in the observed image from a user; apply a bias transformation to the observed corner locations of the object in the observed image to generate de-biased corners for the object in the observed image, where the bias transformation includes a measure of a distance between observed corner locations and de-biased corner locations; generate a map update for the object in the observed image using the de-biased corner locations; and cause a map database to be updated with the object in the observed image according to locations of the de-biased corners.

The apparatus of example embodiments may be caused to generate the applied bias transformation, where causing the apparatus to generate the applied bias transformation may include causing the apparatus to: receive sensor data from an image sensor, where the sensor data is representative of a reference image; determine reference corner locations of an object in the reference image using image processing; generate observed corner locations of the object in the reference image from the determined reference corner locations; and generate the bias transformation based, at least in part, on a difference between the reference corner locations and the observed corner locations of the object in the reference image. Causing the apparatus to generate observed corner locations of the object in the reference image from the determined reference corner locations may include causing the apparatus to: apply a warping function to the reference corner locations; and generate observed corners of the object in the reference image from results of the warping function being applied to the reference corner locations.

Causing the apparatus to generate observed corner locations of the object in the reference image from the determined reference corner locations may include causing the apparatus to generate a plurality of observed corners of the object in the reference image. Causing the apparatus to generate a bias transformation based, at least in part, on a difference between the reference corner locations and the observed corner locations may include causing the apparatus to generate a plurality of bias transformations based, at least in part, on the difference between the reference corner locations and the observed corner locations. Causing the apparatus to apply the bias transformation to the observed corner locations of the object in the observed image may include causing the apparatus to identify a bias transformation of the observed corner locations relative to the reference corner locations and applying the identified bias transformation. The apparatus of example embodiments may be caused to provide an alert in response to the de-biased corners for the object in the observed image being a predetermined distance away from the observed corner locations of the object in the observed image received from the user.

An apparatus of example embodiments may be caused to provide an alert in response to the de-biased corners for the object in the observed image being a predetermined proportion away from the observed corner locations of the object in the observed image received from the user, where the predetermined proportion is based on a size of the object in the observed image. The object in the observed image may include a road sign proximate a road segment, where an apparatus may be caused to provide for autonomous control of a vehicle based, at least in part, on the map update of the object in the observed image. The object in the observed image may include information associated with driving restrictions along the road segment. Causing the apparatus to provide for autonomous control of the vehicle based, at least in part, on the map update of the object in the observed image may include causing the apparatus to provide autonomous control of the vehicle along the road segment based on the driving restrictions of the road sign.

Embodiments of the present disclosure may provide a computer program product including at least one non-transitory computer-readable storage medium having computer-executable program code instructions stored therein. The computer-executable program code instructions including program code instructions to: receive sensor data from an image sensor, where the sensor data is representative of an observed image; receive observed corner locations of an object in the observed image from a user; apply a bias transformation to the observed corner locations of the object in the observed image to generate de-biased corner locations for the object in the observed image, where the bias transformation includes a measure of a distance between observed corner locations and de-biased corner locations; generate a map update for the object in the observed image using the de-biased corner locations for the object; and cause a map database to be updated with the object in the observed image according to locations of the de-biased corners.

Embodiments may include program code instructions to generate the applied bias transformation, where the program code instructions to generate the applied bias transformation may include program code instructions to: receive sensor data from an image sensor, where the sensor data is representative of a reference image; determine reference corner locations of an object in the reference image using image processing; generate observed corner locations of the object in the reference image from the determined reference image corner locations; and generate the bias transformation based, at least in part, on a difference between the reference corner locations and the observed corner locations of the object in the reference image. The program code instructions to generate observed corner locations of the object in the reference image from the determined reference corner locations may include program code instructions to: apply a warping function to the reference corner locations; and generate observed corner locations of the object in the reference image from results of the warping function being applied to the reference corner locations.

The program code instructions to generate observed corner locations of the object in the reference image from the determined reference corner locations may include program code instructions to generate a plurality of observed corner locations of the object in the reference image, where the program code instructions to generate a bias transformation based, at least in part, on a difference between the reference corner locations and the observed corner locations includes program code instructions to generate a plurality of bias transformations based, at least in part, on the difference between the reference corner locations and the observed corner locations. The program code instructions to apply the bias transformation to the observed corner locations of the object in the observed image may include program code instructions to identify a bias transformation of the observed corner locations relative to the reference corner locations and applying the identified bias transformation. Embodiments may include program code instructions to provide an alert in response to the de-biased corner locations for the object in the observed image being a predetermined distance away from the observed corner locations of the object in the observed image received from the user.

Embodiments may include program code instructions to provide an alert in response to the de-biased corner locations for the object in the observed image being a predetermined proportion away from the observed corner locations of the object in the observed image received from the user, where the predetermined proportion is based on a size of the object in the observed image. The object in the observed image may include a road sign proximate a road segment. The computer program product may include program code instructions to provide for autonomous control of a vehicle based, at least in part, on the map update of the object in the observed image. The object in the observed image may include information associated with driving restrictions along the road segment, where the program code instructions to provide for autonomous control of the vehicle based, at least in part, on the map update of the object in the observed image may include program code instructions to provide autonomous control of the vehicle along the road segment based on the driving restrictions of the road sign.

Embodiments described herein may provide a method including: receiving sensor data from an image sensor, where the sensor data is representative of an observed image; receiving observed corner locations of an object in the observed image from a user; applying a bias transformation to the observed corner locations of the object in the observed image to generate de-biased corners for the object in the observed image, where the bias transformation includes a measure of a distance between the observed corner locations and the de-biased corner locations; generating a map update for the object in the observed image using the de-biased corner locations for the object; and causing a map database to be updated with the object in the observed image according to locations of the de-biased corners.

Methods may include generating the applied bias transformation, where generating the applied bias transformation includes: receiving sensor data from an image sensor, where the sensor data is representative of a reference image; determining reference corner locations of an object in the reference image using image processing; generating observed corner locations of the object in the reference image from the determined reference corner locations; and generating the bias transformation based, at least in part, on a difference between the reference corner locations and the observed corner locations of the object in the reference image. Generating observed corner locations of the object in the reference image from the determined reference corner locations may include: applying a warping function to the reference corner locations; and generating observed corners of the object in the reference image from results of the warping function being applied to the reference corner locations.

According to some embodiments, generating observed corner locations of the object in the reference image from the determined reference corner locations may include generating a plurality of observed corners of the object in the reference image. Generating a bias transformation based, at least in part, on a difference between the reference corner locations and the observed corner locations may include generating a plurality of bias transformations based, at least in part, on the difference between the reference corner locations and the observed corner locations. Applying the bias transformation to the observed corner locations of the object in the observed image may include identifying a bias transformation of the observed corner locations relative to the reference corner locations and applying the identified bias transformation.

Embodiments described herein may provide an apparatus including: means for receiving sensor data from an image sensor, where the sensor data is representative of an observed image; means for receiving observed corner locations of an object in the observed image from a user; means for applying a bias transformation to the observed corner locations of the object in the observed image to generate de-biased corners for the object in the observed image, where the bias transformation includes a measure of a distance between the observed corner locations and the de-biased corner locations; means for generating a map update for the object in the observed image using the de-biased corner locations for the object; and means for causing a map database to be updated with the object in the observed image according to locations of the de-biased corners.

An example apparatus may include means for generating the applied bias transformation, where generating the applied bias transformation includes: means for receiving sensor data from an image sensor, where the sensor data is representative of a reference image; means for determining reference corner locations of an object in the reference image using image processing; means for generating observed corner locations of the object in the reference image from the determined reference corner locations; and means for generating the bias transformation based, at least in part, on a difference between the reference corner locations and the observed corner locations of the object in the reference image. The means for generating observed corner locations of the object in the reference image from the determined reference corner locations may include: means for applying a warping function to the reference corner locations; and means for generating observed corners of the object in the reference image from results of the warping function being applied to the reference corner locations.

According to some embodiments, the means for generating observed corner locations of the object in the reference image from the determined reference corner locations may include means for generating a plurality of observed corners of the object in the reference image. The means for generating a bias transformation based, at least in part, on a difference between the reference corner locations and the observed corner locations may include means for generating a plurality of bias transformations based, at least in part, on the difference between the reference corner locations and the observed corner locations. The means for applying the bias transformation to the observed corner locations of the object in the observed image may include means for identifying a bias transformation of the observed corner locations relative to the reference corner locations and applying the identified bias transformation.

The above summary is provided merely for purposes of summarizing some example embodiments to provide a basic understanding of some aspects of the invention. Accordingly, it will be appreciated that the above-described embodiments are merely examples and should not be construed to narrow the scope or spirit of the invention in any way. It will be appreciated that the scope of the invention encompasses many potential embodiments in addition to those here summarized, some of which will be further described below.

BRIEF DESCRIPTION OF THE DRAWINGS

Figure 1:
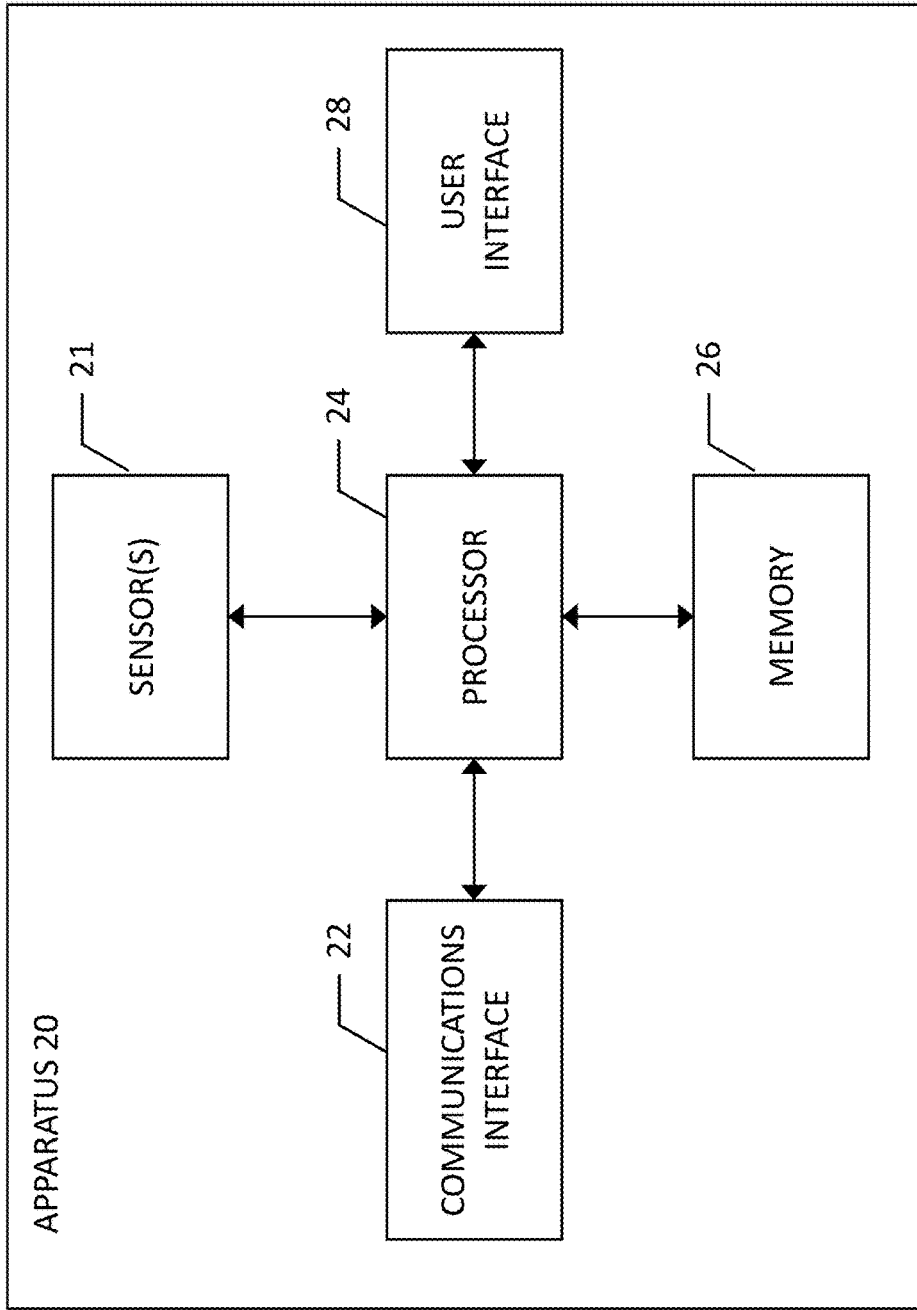
Figure 2:
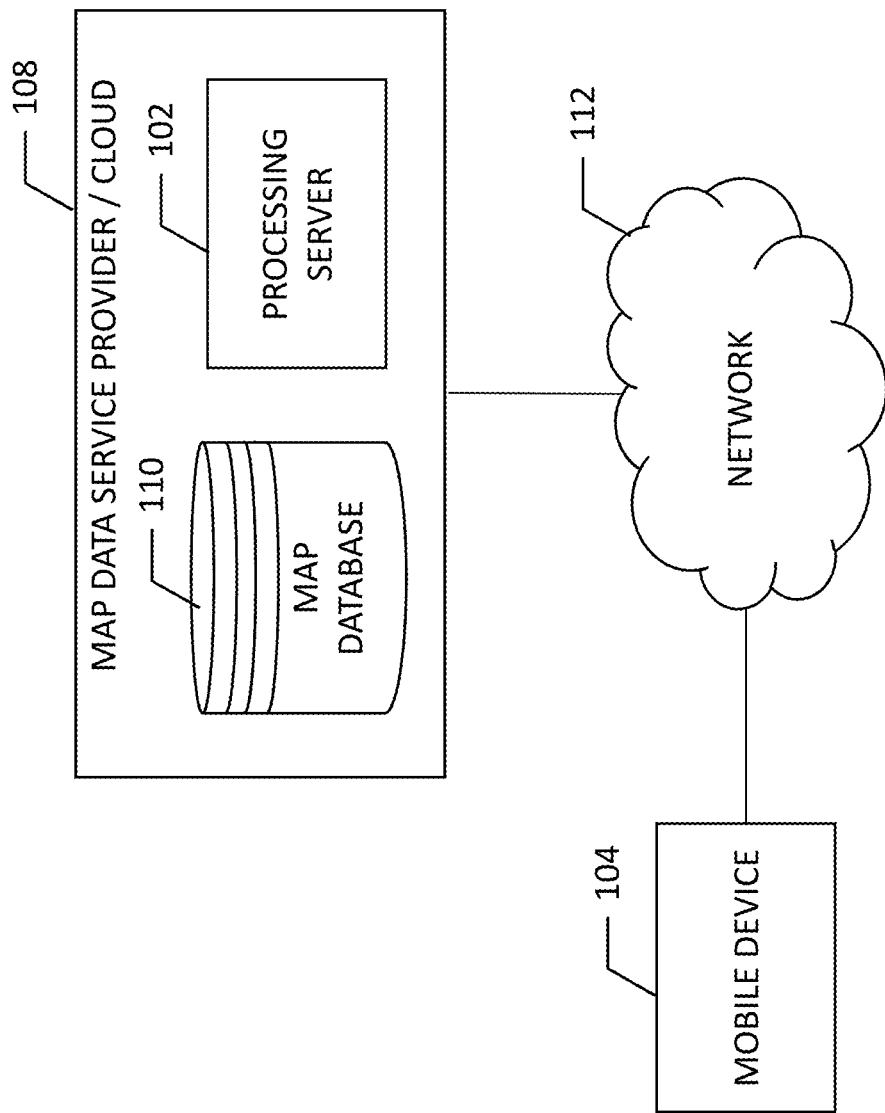
Figure 3:
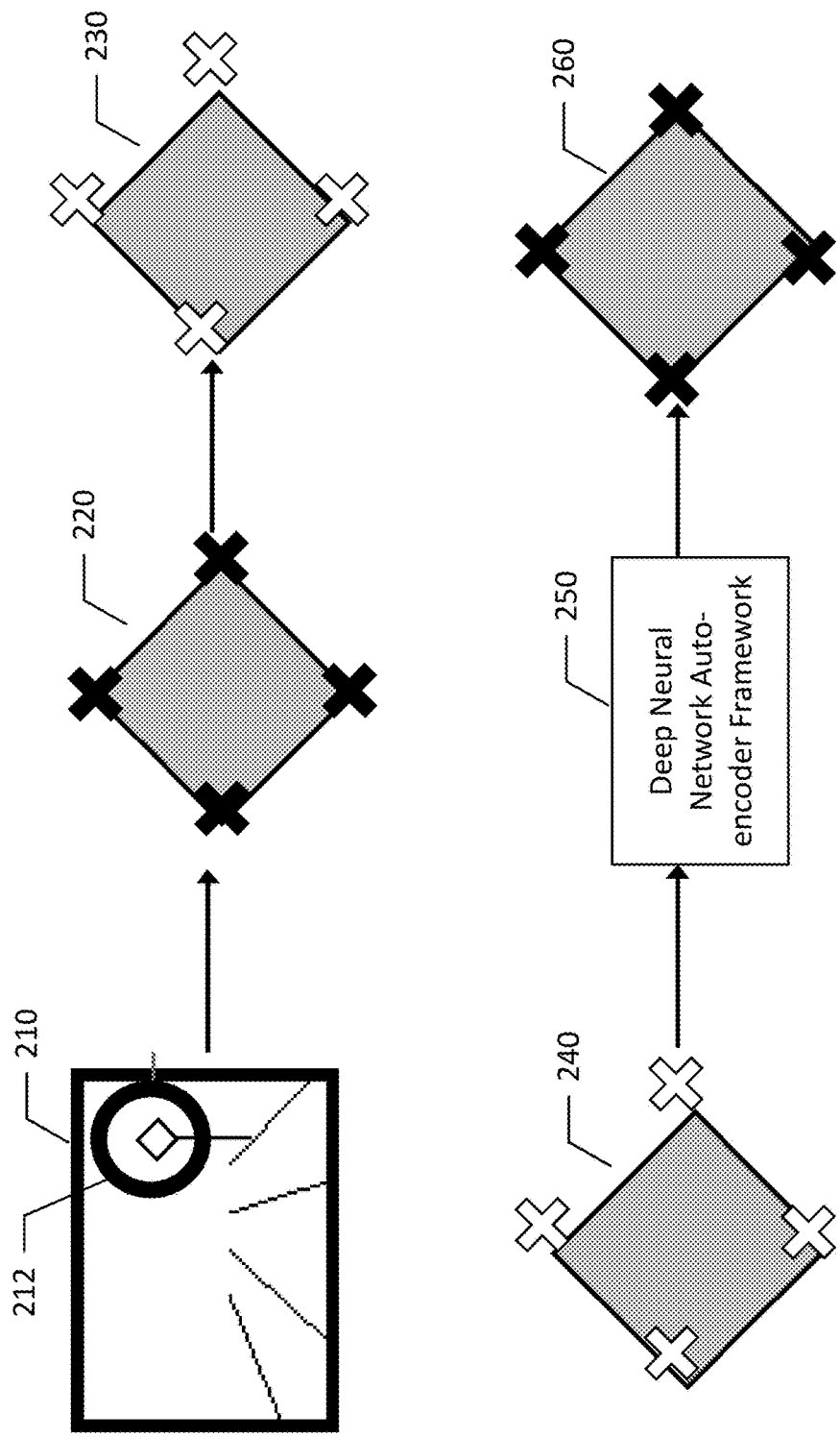
Figure 4:
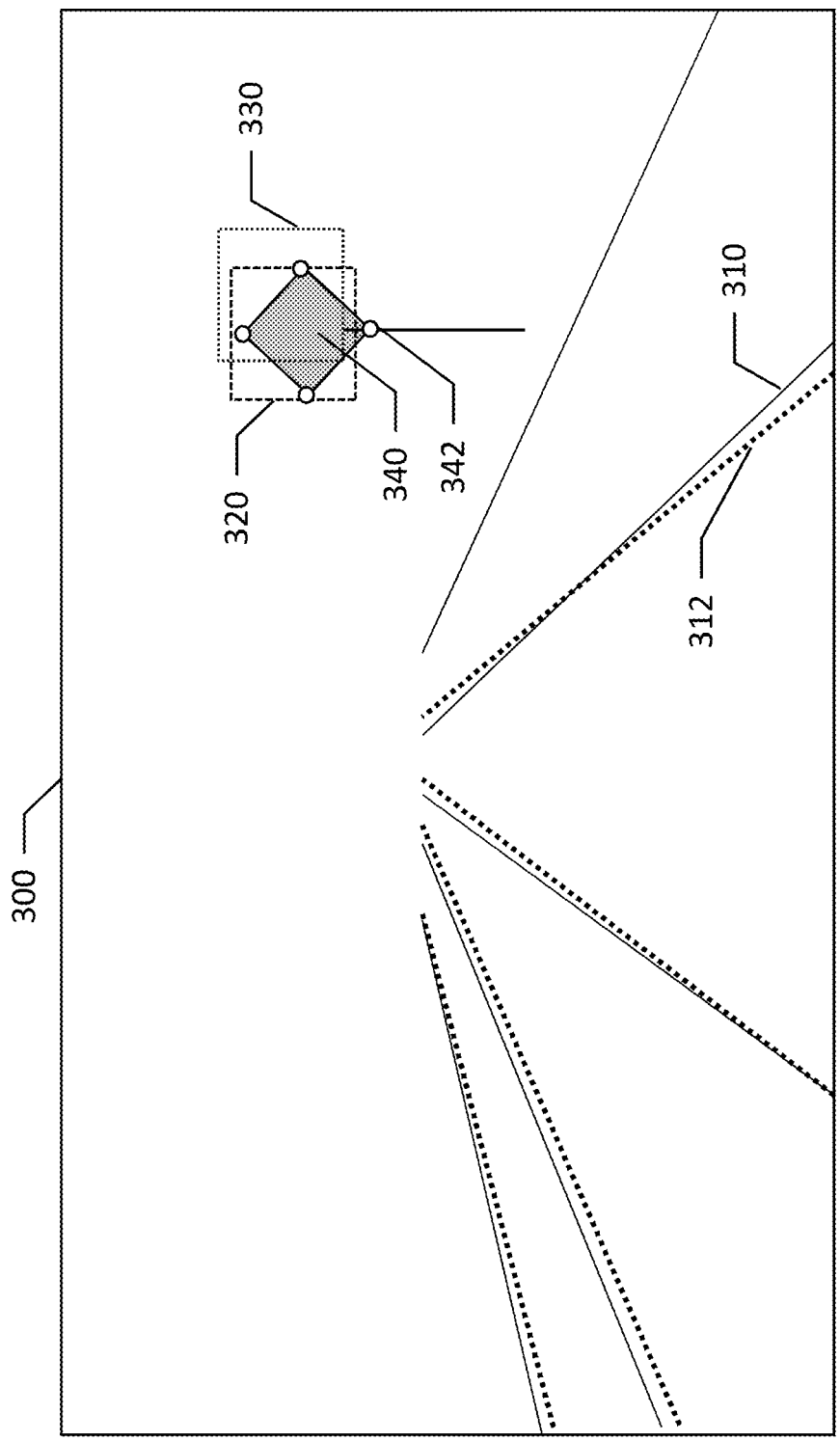
Figure 5:
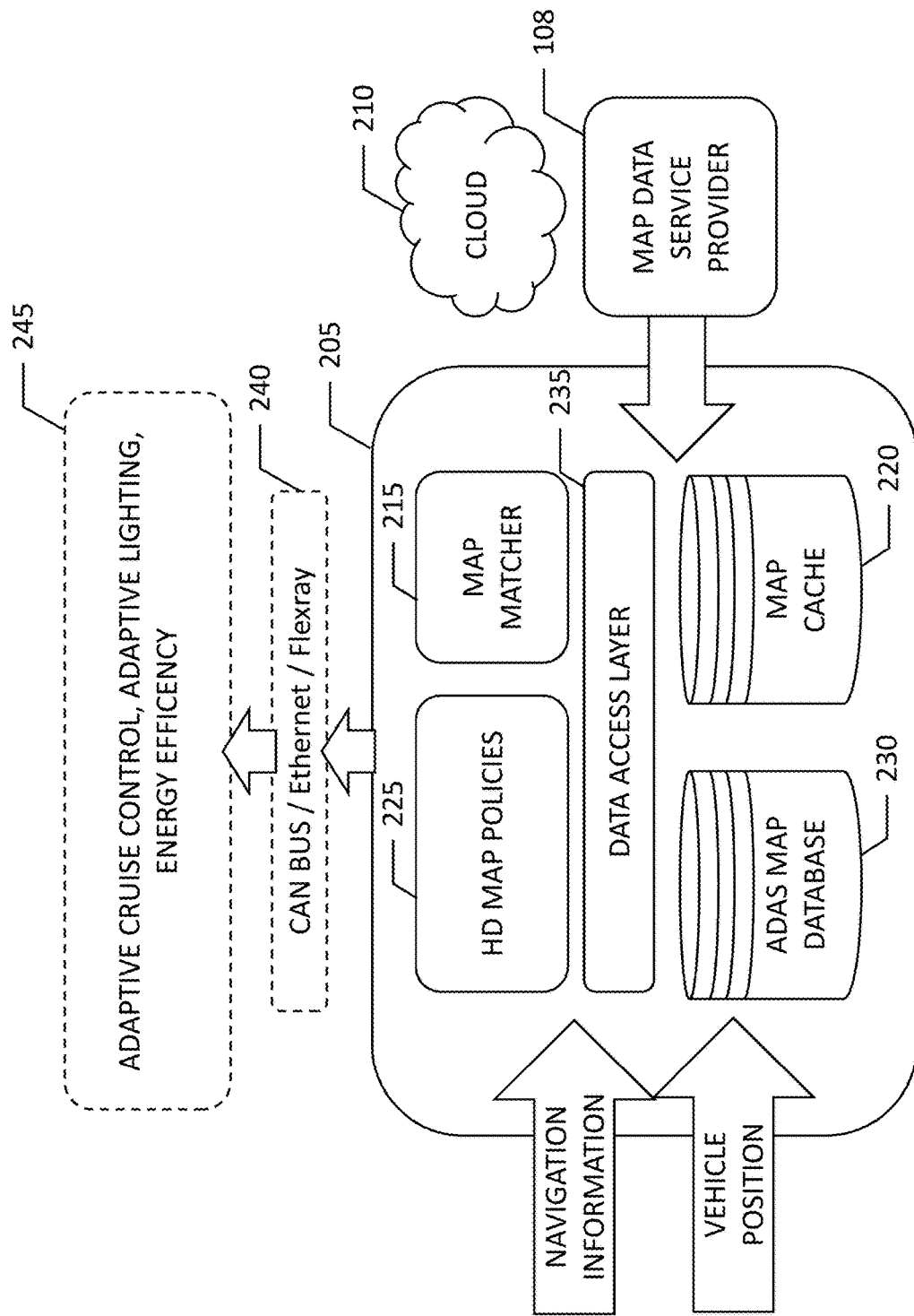
Figure 6:
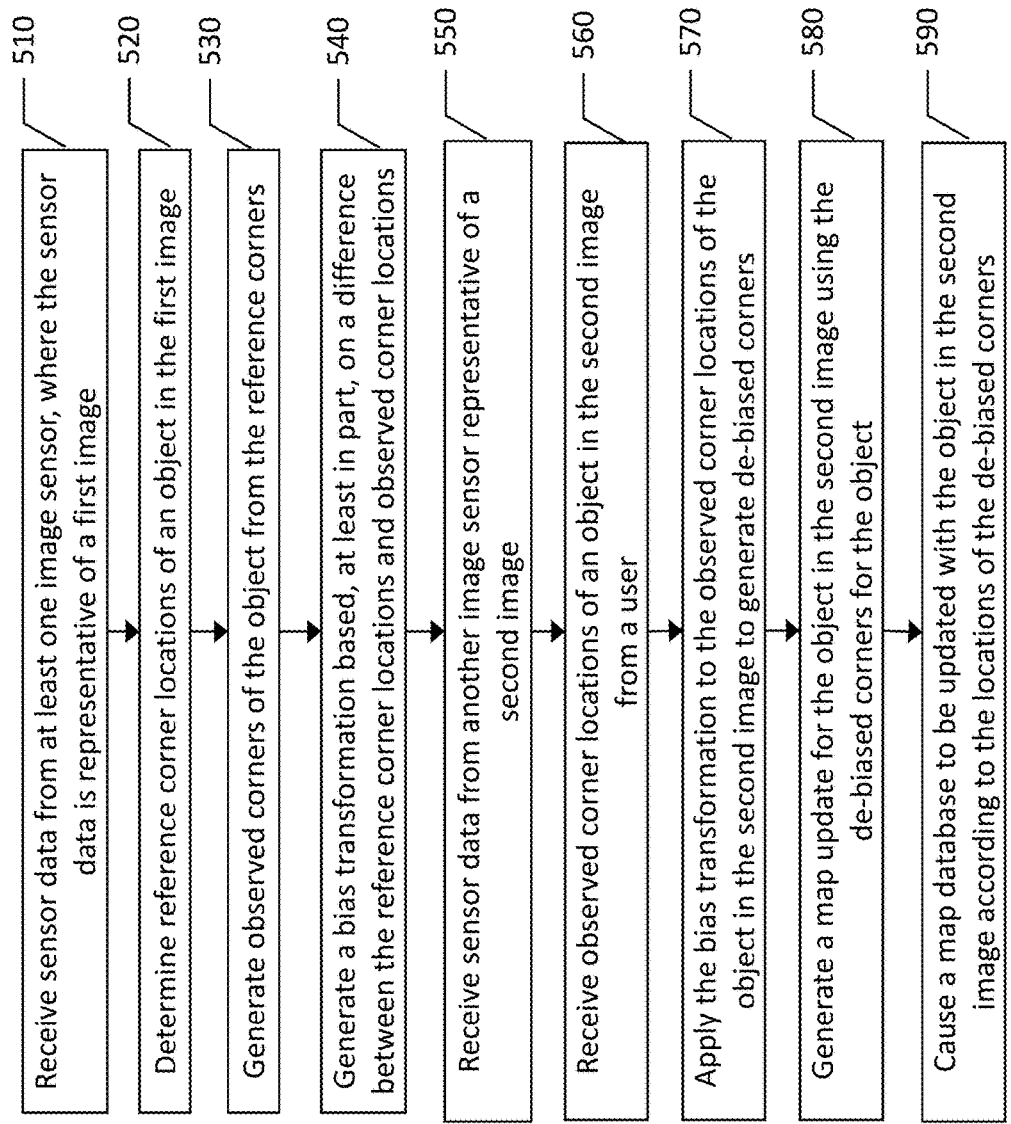

Having thus described certain example embodiments of the present invention in general terms, reference will hereinafter be made to the accompanying drawings which are not necessarily drawn to scale, and wherein:

FIG. 1 is a block diagram of an apparatus according to an example embodiment of the present disclosure;

FIG. 2 is a block diagram of a system for generating learning data to facilitate de-biasing the labeled location of an object of interest within an image according to an example embodiment of the present disclosure;

FIG. 3 illustrates the process of learning examples of bias of an object location and applying the learned bias to de-bias a manually labeled object location according to an example embodiment of the present disclosure;

FIG. 4 illustrates a captured image including an object that has been manually located and labeled and de-biased according to an example embodiment of the present disclosure;

FIG. 5 is a block diagram of a system for implementing the methods described herein to generate learning data to facilitate de-biasing the labeled location of an object of interest within an image and to provide for autonomous control of a vehicle responsive thereto according to an example embodiment of the present disclosure; and FIG. 6 is a flowchart of operations for generating learning data to facilitate de-biasing the labeled location of an object of interest within an image according to an example embodiment of the present disclosure.

DETAILED DESCRIPTION

Some embodiments of the present invention will now be described more fully hereinafter with reference to the accompanying drawings, in which some, but not all, embodiments of the invention are shown. Indeed, various embodiments of the invention may be embodied in many different forms and should not be construed as limited to the embodiments set forth herein; rather, these embodiments are provided so that this disclosure will satisfy applicable legal requirements. Like reference numerals refer to like elements throughout. As used herein, the terms "data," "content," "information," and similar terms may be used interchangeably to refer to data capable of being transmitted, received and/or stored in accordance with embodiments of the present invention. Thus, use of any such terms should not be taken to limit the spirit and scope of embodiments of the present invention.

A method, apparatus and computer program product are provided in accordance with an example embodiment of the present invention to facilitate perception system training for automatically detecting objects of interest in an environment. In the context of mapping, objects or features of interest in the environment may include lanes, signs, obstacles, etc. Perception systems may detect these features and objects in an environment and understand the features and objects in the context of the environment. In order for a perception system to reliably detect features and objects, large volumes of training data may be collected from a data capture platform and objects and features of images of the environment may be positively identified in order for the perception system to understand how to identify objects and features of the environment. Conventionally, humans may perform the positive identification of objects and features as manual labelers of objects and features in the images. Such manual labeling may include identification and classification of objects within an image of an environment, together with providing an indication of a location of the objects within the image of the environment.

A challenge with manual labeling of objects in an environment is that individual data labelers have inherent biases when it comes to the labeling process. For instance, if a single labeler is responsible to cover a certain number of miles of data for a predefined region, then the bias introduced by the labeler may affect all data within the region. The biases are typically due to usage patterns of the labeling tools and interface constraints that are present. For instance, a specific labeler may mark the corner of a sign slightly off of the actual sign corner in an image, and the bias may be shifted a certain degree, such as a matter of pixels. Another example may include a labeler who marks the same image as also slightly off, but with the offset being in a different direction and/or magnitude. The bias in the position of such marked features may lead the perception system to learn feature perceptions that incorporate the bias, so the output of the perception module will be offset by the relative bias, rather than aligned with the actual corner of the object. Embodiments described herein remedy this by de-biasing or removing the bias from the labeled data.

FIG. 1 is a schematic diagram of an example apparatus configured for performing some of the operations described herein, particularly the gathering of training data and for using the perception system for identifying objects in an image. Apparatus 20 is an example embodiment that may be embodied by or associated with any of a variety of computing devices that include or are otherwise associated with a device configured for providing an advanced driver assistance features. For example, the computing device may be an Advanced Driver Assistance System module (ADAS) which may at least partially control autonomous or semi-autonomous features of a vehicle with the assistance of establishing object location using a perception system trained according to example embodiments described herein; however embodiments of the apparatus may be embodied or partially embodied as a mobile terminal, such as a personal digital assistant (PDA), mobile telephone, smart phone, personal navigation device, tablet computer, camera or any combination of the aforementioned systems. In an example embodiment for facilitating autonomous or partially autonomous vehicle control, the apparatus 20 may embodied or partially embodied by an electronic control unit of a vehicle that supports safety-critical systems such as the powertrain (engine, transmission, electric drive motors, etc.), steering (e.g., steering assist or steer-by-wire), and braking (e.g., brake assist or brake-by-wire). Optionally, the computing device may be a computing device that is installed within a vehicle, such as a built-in vehicular navigation device, assisted driving device, or the like.

Optionally, the apparatus may be embodied by or associated with a plurality of computing devices that are in communication with or otherwise networked with one another such that the various functions performed by the apparatus may be divided between the plurality of computing devices that operate in collaboration with one another.

The apparatus 20 may be equipped or in communication with any number of sensors 21, such as a global positioning system (GPS), accelerometer, image sensor, LiDAR (Light Distancing and Ranging) sensor, radar, and/or gyroscope. Any of the sensors may be used to sense information regarding the movement, positioning, or orientation of the device for use in navigation assistance, as described herein according to example embodiments. In some example embodiments, such sensors may be implemented in a vehicle or other remote apparatus, and the information detected may be transmitted to the apparatus 20, such as by near field communication (NFC) including, but not limited to, Bluetooth™ communication, or the like.

The apparatus 20 may include, be associated with, or may otherwise be in communication with a communication interface 22, processor 24, a memory device 26 and a user interface 28. In some embodiments, the processor (and/or co-processors or any other processing circuitry assisting or otherwise associated with the processor) may be in communication with the memory device via a bus for passing information among components of the apparatus. The memory device may be non-transitory and may include, for example, one or more volatile and/or non-volatile memories. In other words, for example, the memory device may be an electronic storage device (for example, a computer readable storage medium) comprising gates configured to store data (for example, bits) that may be retrievable by a machine (for example, a computing device like the processor). The memory device may be configured to store information, data, content, applications, instructions, or the like for enabling the apparatus to carry out various functions in accordance with an example embodiment of the present invention. For example, the memory device could be configured to buffer input data for processing by the processor. Additionally or alternatively, the memory device could be configured to store instructions for execution by the processor.

The processor 24 may be embodied in a number of different ways. For example, the processor may be embodied as one or more of various hardware processing means such as a coprocessor, a microprocessor, a controller, a digital signal processor (DSP), a processing element with or without an accompanying DSP, or various other processing circuitry including integrated circuits such as, for example, an ASIC (application specific integrated circuit), an FPGA (field programmable gate array), a microcontroller unit (MCU), a hardware accelerator, a special-purpose computer chip, or the like. As such, in some embodiments, the processor may include one or more processing cores configured to perform independently. A multi-core processor may enable multiprocessing within a single physical package. Additionally or alternatively, the processor may include one or more processors configured in tandem via the bus to enable independent execution of instructions, pipelining and/or multithreading.

In an example embodiment, the processor 24 may be configured to execute instructions stored in the memory device 26 or otherwise accessible to the processor. Alternatively or additionally, the processor may be configured to execute hard coded functionality. As such, whether configured by hardware or software methods, or by a combination thereof, the processor may represent an entity (for example, physically embodied in circuitry) capable of performing operations according to an embodiment of the present invention while configured accordingly. Thus, for example, when the processor is embodied as an ASIC, FPGA or the like, the processor may be specifically configured hardware for conducting the operations described herein. Alternatively, as another example, when the processor is embodied as an executor of software instructions, the instructions may specifically configure the processor to perform the algorithms and/or operations described herein when the instructions are executed. However, in some cases, the processor may be a processor of a specific device (for example, the computing device) configured to employ an embodiment of the present invention by further configuration of the processor by instructions for performing the algorithms and/or operations described herein. The processor may include, among other things, a clock, an arithmetic logic unit (ALU) and logic gates configured to support operation of the processor.

The apparatus 20 of an example embodiment may also include or otherwise be in communication with a user interface 28. The user interface may include a touch screen display, a speaker, physical buttons, and/or other input/output mechanisms. In an example embodiment, the processor 24 may comprise user interface circuitry configured to control at least some functions of one or more input/output mechanisms. The processor and/or user interface circuitry comprising the processor may be configured to control one or more functions of one or more input/output mechanisms through computer program instructions (for example, software and/or firmware) stored on a memory accessible to the processor (for example, memory device 24, and/or the like).

The apparatus 20 of an example embodiment may also optionally include a communication interface 22 that may be any means such as a device or circuitry embodied in either hardware or a combination of hardware and software that is configured to receive and/or transmit data from/to other electronic devices in communication with the apparatus, such as by NFC, described above. Additionally or alternatively, the communication interface 22 may be configured to communicate over cellular or other wireless protocols including Global System for Mobile Communications (GSM), such as but not limited to Long Term Evolution (LTE). In this regard, the communication interface 22 may include, for example, an antenna (or multiple antennas) and supporting hardware and/or software for enabling communications with a wireless communication network. Additionally or alternatively, the communication interface 22 may include the circuitry for interacting with the antenna(s) to cause transmission of signals via the antenna(s) or to handle receipt of signals received via the antenna(s). In some environments, the communication interface 22 may optionally support wired communication and/or may alternatively support vehicle to vehicle or vehicle to infrastructure wireless links.

The apparatus 20 may support a mapping or navigation application so as to present maps or otherwise provide navigation, driver assistance, or some degree of autonomous control of a vehicle. For example, the apparatus 20 may provide for display of a map and/or instructions for following a route within a network of roads via user interface 28. In order to support a mapping application, the computing device may include or otherwise be in communication with a geographic database, such as may be stored in memory 26. For example, the geographic database includes node data records, road segment or link data records, point of interest (POI) data records, and other data records. More, fewer or different data records can be provided. In one embodiment, the other data records include cartographic data records, routing data, and maneuver data. One or more portions, components, areas, layers, features, text, and/or symbols of the POI or event data can be stored in, linked to, and/or associated with one or more of these data records. For example, one or more portions of the POI, event data, or recorded route information can be matched with respective map or geographic records via position or GPS data associations (such as using known or future map matching or geo-coding techniques), for example. Furthermore, other positioning technology may be used, such as electronic horizon sensors, radar, LiDAR, ultrasonic and/or infrared sensors.

In example embodiments, a navigation system user interface may be provided to provide driver assistance to a user traveling along a network of roadways. Optionally, embodiments described herein may provide assistance for autonomous or semi-autonomous vehicle control. Autonomous vehicle control may include driverless vehicle capability where all vehicle functions are provided by software and hardware to safely drive the vehicle along a path identified by the vehicle. Semi-autonomous vehicle control may be any level of driver assistance from adaptive cruise control, to lane-keep assist, or the like. Identifying objects along road segments or road links that a vehicle may traverse may provide information useful to navigation and autonomous or semi-autonomous vehicle control by establishing barriers defining roadway width, identifying roadway curvature, locating signs and identifying information communicated by the sign, or any boundary related details of the road links that may be traversed by the vehicle.

Autonomous vehicles, or vehicles with some level of autonomous controls, provide some degree of vehicle control that was previously performed by a person driving a vehicle. Removing some or all of the responsibilities of driving from a person and automating those responsibilities requires a high degree of confidence in performing those responsibilities in a manner at least as good as a human driver. For example, maintaining a vehicle's position within a lane by a human involves steering the vehicle between observed lane markings and determining a lane when lane markings are faint, absent, or not visible due to weather (e.g., heavy rain, snow, bright sunlight, etc.). A vehicle with autonomous capability to keep the vehicle within a lane as it travels along a road segment must also be able to identify the lane based on the lane markings or other features that are observable. As such, the autonomous vehicle must be equipped with sensors sufficient to observe road features, and a controller that is capable of processing the signals from the sensors observing the road features, interpret those signals, and provide vehicle control to maintain the lane position of the vehicle based on the sensor data. A perception system may be used to interpret the information gathered by the sensors, such as one or more image sensors, to identify objects and features of a roadway. The perception system may be trained through a neural network using training data that identifies objects and features to facilitate real-time identification of objects and features in an environment of the vehicle through the perception system. Maintaining lane position is merely one illustrative example of a function of autonomous or semi-autonomous vehicles that demonstrates the sensor level and complexity of autonomous driving. However, autonomous vehicle capabilities, particularly in fully autonomous vehicles, must be capable of performing all driving functions. As such, the vehicles must be equipped with sensor packages that enable the functionality in a safe manner.

Beyond sensors on a vehicle, autonomous and semi-autonomous vehicles may use high definition (HD) maps to help navigate and to control a vehicle along its path. These HD maps may provide road geometry, lane geometry, road segment restrictions (e.g., speed limits), lane restrictions (e.g., turn-only lanes), and any other information that may be related to the road segments of a road network. Further, HD maps may be dynamic and may receive updates periodically from map services providers which may be informed by vehicles traveling along the road segments with sensor packages able to identify and update the HD maps. Further, properties of road segments may change at different times of day or different days of the week, such as express lanes which may be in a first direction of travel at a first time of day, and a second direction of travel at a second time of day. HD maps may include this information to provide accurate navigation and to facilitate autonomy along these road segments to supplement a sensor package associated with a vehicle. Embodiments described herein may facilitate the building and updating of HD maps through the perception systems being able to reliably interpret features and objects along a road segment, and providing that data to a map services provider. Crowd sourced data from vehicles traveling along a roadway may provide object and feature information, or provide image data that is processed through a perception system of the map services provider to identify features and objects for map updates and generation.

A map service provider database may be used to provide driver assistance via a navigation system and/or through an ADAS having autonomous or semi-autonomous vehicle control features. FIG. 2 illustrates a communication diagram of an example embodiment of a system for implementing example embodiments described herein. The illustrated embodiment of FIG. 2 includes a mobile device 104, which may be, for example, the apparatus 20 of FIG. 2, such as a mobile phone, an in-vehicle navigation system, an ADAS, or the like, and a map data service provider or cloud service 108. Each of the mobile device 104 and map data service provider 108 may be in communication with at least one of the other elements illustrated in FIG. 2 via a network 112, which may be any form of wireless or partially wireless network as will be described further below. Additional, different, or fewer components may be provided. For example, many mobile devices 104 may connect with the network 112. The map data service provider 108 may be cloud-based services and/or may operate via a hosting server that receives, processes, and provides data to other elements of the system.

The map data service provider may include a map database 110 that may include node data, road segment data or link data, point of interest (POI) data, traffic data or the like. The map database 110 may also include cartographic data, routing data, and/or maneuvering data. According to some example embodiments, the road segment data records may be links or segments representing roads, streets, or paths, as may be used in calculating a route or recorded route information for determination of one or more personalized routes. The node data may be end points corresponding to the respective links or segments of road segment data. The road link data and the node data may represent a road network, such as used by vehicles, cars, trucks, buses, motorcycles, and/or other entities. Optionally, the map database 110 may contain path segment and node data records or other data that may represent pedestrian paths or areas in addition to or instead of the vehicle road record data, for example. The road/link segments and nodes can be associated with attributes, such as geographic coordinates, street names, address ranges, speed limits, turn restrictions at intersections, and other navigation related attributes, as well as POIs, such as fueling stations, hotels, restaurants, museums, stadiums, offices, auto repair shops, buildings, stores, parks, etc. The map database 110 can include data about the POIs and their respective locations in the POI records. The map database 110 may include data about places, such as cities, towns, or other communities, and other geographic features such as bodies of water, mountain ranges, etc. Such place or feature data can be part of the POI data or can be associated with POIs or POI data records (such as a data point used for displaying or representing a position of a city). In addition, the map database 110 can include event data (e.g., traffic incidents, construction activities, scheduled events, unscheduled events, etc.) associated with the POI data records or other records of the map database 110.

The map database 110 may be maintained by a content provider e.g., the map data service provider and may be accessed, for example, by the content or service provider processing server 102. By way of example, the map data service provider can collect geographic data and dynamic data to generate and enhance the map database 110 and dynamic data such as traffic-related data contained therein.

There can be different ways used by the map developer to collect data. These ways can include obtaining data from other sources, such as municipalities or respective geographic authorities, such as via global information system databases. In addition, the map developer can employ field personnel to travel by vehicle along roads throughout the geographic region to observe features and/or record information about them, for example. Also, remote sensing, such as aerial or satellite photography and/or LiDAR, can be used to generate map geometries directly or through machine learning as described herein. However, the most ubiquitous form of data that may be available is vehicle data provided by vehicles, such as mobile device 104, as they travel the roads throughout a region. As noted above, sensor data from vehicles may be processed according to example embodiments described herein using a perception system to identify objects and features of a road segment. This data may be used to build and/or update the map database 110.

The map database 110 may be a master map database, such as an HD map database as described further below, stored in a format that facilitates updates, maintenance, and development. For example, the master map database or data in the master map database can be in an Oracle spatial format or other spatial format, such as for development or production purposes. The Oracle spatial format or development/production database can be compiled into a delivery format, such as a geographic data files (GDF) format. The data in the production and/or delivery formats can be compiled or further compiled to form geographic database products or databases, which can be used in end user navigation devices or systems.

For example, geographic data may be compiled (such as into a platform specification format (PSF) format) to organize and/or configure the data for performing navigation-related functions and/or services, such as route calculation, route guidance, map display, speed calculation, distance and travel time functions, and other functions, by a navigation device, such as by a vehicle represented by mobile device 104, for example. The navigation-related functions can correspond to vehicle navigation, pedestrian navigation, or other types of navigation. The compilation to produce the end user databases can be performed by a party or entity separate from the map developer. For example, a customer of the map developer, such as a navigation device developer or other end user device developer, can perform compilation on a received map database in a delivery format to produce one or more compiled navigation databases.

As mentioned above, the map data service provider 108 map database 110 may be a master geographic database, but in alternate embodiments, a client side map database may represent a compiled navigation database that may be used in or with end user devices (e.g., mobile device 104) to provide navigation and/or map-related functions. For example, the map database 110 may be used with the mobile device 104 to provide an end user with navigation features and/or to facilitate autonomous or partial autonomous control of a vehicle. In such a case, the map database 110 can be downloaded or stored on the end user device which can access the map database 110 through a wireless or wired connection, such as via a processing server 102 and/or the network 112, for example.

The map database 110 of example embodiments may be generated from a plurality of different sources of data. For example, municipalities or transportation departments may provide map data relating to road ways, while geographic information survey systems may provide information regarding areas beyond the road network. Additional data may be stored in the map database such as traffic information, routing information, etc. This data may supplement the HD map data that provides an accurate depiction of a network of roads in the geographic region in a high level of detail including road geometries, features along the roads such as signs, rules related to travel along road segments such as speed limits, etc. The data stored in the map database may be gathered from multiple different sources, and one source of data that may help keep the data in the map database fresh is map data provided by vehicles traveling along the road segments of the road network.

While municipalities and businesses may provide map data to a map database, the ubiquity with which vehicles travel along road segments render those vehicles as opportunities to collect data related to the road segments provided the vehicles are equipped with some degree of sensor technology. A vehicle traveling along a road segment with only location sensing technology such as a Global Positioning System may provide data relating to the path of a road segment, while vehicles with more technologically advanced sensors may be able to provide additional information. Sensor data from image sensors or depth sensors such as LiDAR may provide details regarding the features of road segments including the position of signs along the road segment and the information contained on the signs. This data may be crowd sourced by map data service providers 108 to build more robust and reliable maps with a greater level of detail than previously available. Further, beyond building the maps in the map database 110, sensor data may be used to update map data or confirm existing map data to ensure the map database 110 is maintained and as up-to-date as possible.

Autonomous and semi-autonomous vehicles leverage sensor information relating to roads, objects, and features proximate the roads to determine safe regions of a road to drive and to evaluate their surroundings as they traverse a road segment. Further, autonomous and semi-autonomous vehicles may use high-definition map information to facilitate autonomous driving and to plan autonomous driving routes. These high-definition maps or HD maps may be specifically designed and configured to facilitate autonomous and semi-autonomous vehicle control and may be able to replicate road segments virtually with the inclusion of accurately placed signs and detailed information contained therein along with other features or objects proximate a roadway.

HD maps may have a high precision at resolutions that may be down to several centimeters and may identify objects proximate a road segment, features of a road segment including lane widths, lane markings, traffic direction, road signs, speed limits, lane restrictions, etc. Autonomous and semi-autonomous vehicles may use these HD maps to facilitate the autonomous control features, such as traveling within a lane of a road segment at a prescribed speed limit, or following instructions of a road sign identified along a road segment. Autonomous vehicles may also be equipped with a plurality of sensors to facilitate autonomous vehicle control. Sensors may include image sensors/cameras, Light Distancing and Ranging (LiDAR), Global Positioning Systems (GPS), Inertial Measurement Units (IMUs), or the like which may measure the surroundings of a vehicle and communicate information regarding the surroundings to a vehicle control module to process and adapt vehicle control accordingly.

HD maps may be generated and updated based on sensor data from vehicles traveling along road segments of a road network. These vehicles may have various degrees of autonomy and may be equipped with a variety of different levels of sensors. Sensors from fully autonomous vehicles, for example, may be used to update map data or generate new map data in a form of crowd-sourced data from vehicles traveling along road segments. Sensor data received can be compared against other sensor data relating to the images captured by sensors to establish the accuracy of sensor data and to confirm the position, size, shape, etc. of features and objects along the road segment.

Embodiments described herein may broadly relate to computer vision when there is a need to establish the identification and position of an object or feature within an environment, as may be beneficial to the generation and confirmation of HD maps facilitating autonomous or semi-autonomous vehicle control. For example, objects and features along a road segment may be detected through processing of sensor data through a perception system. A perception system may discern objects and features within an environment and be capable of efficiently locating and classifying the objects according to the type of object. However, in order to efficiently locate and classify objects, a perception system may require training data from which object identification can be learned through a machine-learning technique in order to reliably and efficiently identify objects within an environment.

Training data for a perception system may be generated through initial image capture using, for example, sensors 21, and objects within the images may be manually labeled to create a positive and definitive identification of objects within the image. However, in order to train a perception system, a large volume of training data may be needed. Generally, the more training data used, the more accurate the perception system. However, manually labeled training data may include inherent biases where a labeler, based on hardware, software, labeling tools, etc., may introduce biases into the training data by indicating a location of an object or anchor point thereof that is offset from the actual location of the object. Such bias may be due to labeling hardware calibration, user error, or any number of factors. Embodiments described herein automatically de-bias or remove bias from datasets in hand-labeled or manually labeled settings The methods of the present disclosure use a data-driven approach to correcting bias, such as in an on-line manner. To de-bias the dataset as the user marks or labels the data, a deep neural network provided by the apparatus 20, such as the processor 24, may be used. The training procedure for the network is described further below.

In order to train the deep neural network to de-bias the location of reference points such as corners or points marked by manual labeling, training data may be automatically generated from random sets of images captured "in the wild" through crowd sourcing. Such sets of images may be generated by vehicles traversing a road network with sensor capabilities commensurate with data generation for use by the perception systems described herein. The training data that is selected should be representative of the typical domains in which the labeling is being performed. For example, images of roads and highways may be typical domains for use with autonomous vehicles and perception systems thereof.

According to embodiments described herein, image processing software is run by the apparatus 20, such as the processor 24, on a set of images to identify the corners of objects detected within the images. This corner detection is used to obtain an initial set of corner locations or "reference corners." The reference corners of objects within training images may be established based on image detection techniques employed by the image processing software capable of locating anchor points or reference points/corners of objects. The image detection techniques may be based on machine learning of object locations and may provide a close approximation of the actual locations of the corners or anchor points of an object within an image. Once a plurality of training images are obtained with reference corners automatically detected by image detection techniques, a random warping function may be applied to one or more of the images that simulates user (manual labeler) bias, such as displacing points slightly to the right by a few pixels, and the warping function is applied to all reference corners. The random warping function may be applied by the apparatus, such as the processor. This application of the warping function to the reference corners generates the set of "observed corners" that are biased. In this manner, a set of training data is generated that includes an estimated bias based on the warping function of the object reference points, determined by image detection techniques, relative to the "observed points" which are outputs of the warping function.

FIG. 3 illustrates an example embodiment of the present disclosure in which an object location within an image is de-biased. As shown, the training dataset is input to the network in the form of images, such as image 210, including an object 212 disposed along a road segment where the object is, in this case, a sign having a diamond shape. The training dataset may be processed by the image processing software to determine reference corners in the training data image as shown at 220. The warping function may be applied to the reference corners in 220 to establish artificial observed corners at 230. The observed corners generated through the warping function are "artificial" in that they are not actually observed or identified manually, but instead are estimations of biased corner locations based on the warping function applied between 220 and 230. This process is performed many times over to establish a database of training data and observed corners relative to reference corners such that when actual observed corners are received, e.g., when a person manually labels the corners of an object in an image, the bias can be removed based on the large amount of training data. A single image having a single object with identified reference corners may be used as the subject of a plurality of warping functions, such that a plurality of artificial corners may be generated from the reference corners, with each set of artificial corners being the result of a different warping function. Thus, a single image may produce a large amount of training data. Further, using this same process on a plurality of images results in training data that is orders of magnitude greater in volume than actual observed images. The warping function used to produce the artificial corners may be stored with each training data image such that when a manually labeled image corresponds to artificial corners of a training data image, the warping function used to generate the training data image may be used as a bias transformation to de-bias the data from the manual labeler.

In an image such as image 210, object corners may be manually labeled as shown at 240 of FIG. 3 to establish observed corners as viewed and labeled by a person. These actual observed corners of the object 240 may be input into a deep neural network auto-encoder framework 250, such as provided by the apparatus 20, such as the processor 24, which is informed by training data generated as described above with respect to elements 210-230 of FIG. 3. Based on the training data of the deep neural network, embodiments described herein may remove the bias of the observed corners of 240 to produce de-biased corners that approximate the ideal corners of the object. In essence, the observed corners of 240 are compared against the generated training data which recognizes the observed corners as biased in a manner commensurate with at least a portion of the training data, which enables the deep neural network auto-encoder framework 250 to understand and then remove the bias that is understood from the observed corners of 240 to obtain the de-biased corners of 260.

The bias of a manual labeler may be established through a comparison of artificial corners with manually labeled corners, and extracting the warping function applied as a bias transformation to the artificial corners that align with the manually labeled corners. This bias transformation may then be used to de-bias future data from the same manual labeler such that the error or bias introduced by the manual labeler is removed and the data becomes de-biased.

The network architecture may be in the form of an auto encoder implemented by the apparatus 20, such as the processor 24, which learns the transformation from the actual observed, biased corners to the ideal corners, in essence, the de-biasing process. Large volumes of true data can be used to train the perception system, where "true data" is data that is manually labeled and confirmed to accurately identify any relevant points, such as corners of an object. The choice of warping functions to generate observed corners may be extensive, leading to data advantages to scale training at the network from even a relatively few data samples. This method can help de-bias a true data set to avoid bias propagating through the data generated by a manual labeling effort. Further, if a de-biased object location or "ideal corner" approximation is above a predefined distance away or a predefined proportion away from a manually labeled observed corner, an alert may be generated to cause the labeled image to be reviewed for quality assurance. This extra check ensures that any substantial deviation between a labeled corner and a de-biased corner is confirmed before becoming part of the training dataset from which future images will be processed.

FIG. 4 illustrates a captured image 300 including lane lines 310 together with the detected lane line location 312. As shown, there is some degree of lane line detection bias for which example embodiments described herein can be applied. However, the example embodiment described with respect to FIG. 4 concentrates on the sign 340 disposed adjacent to the road. As shown, a user identification of the observed corners is labeled using box 330. Using previously generated training data and the deep neural network auto-encoder, embodiments described herein may de-bias this data moving the observed corners to the approximation of the ideal corners shown by box 320, which is considerably closer to the actual corners shown as 342.

Embodiments described herein may broadly relate to computer vision when there is a need to establish the identification and position of an object or feature within an environment, as may be beneficial to the generation and confirmation of HD maps facilitating autonomous or semi-autonomous vehicle control. For example, objects and features along a road segment may be detected through processing of sensor data through a perception system. A perception system may discern objects and features within an environment and be capable of efficiently locating and classifying the objects according to the type of object. However, in order to efficiently locate objects, a perception system may require the ability to remove bias that may be introduced through a manual labeling effort. Embodiments described herein improve the training data of a perception system through the de-biasing of object location within the environment and confirming any substantial issues arising from de-biased object locations differing from manually labeled object locations.

Detecting objects and features within captured sensor data of an environment may be difficult and may suffer from inherent bias based on the nature of the labeling efforts required to train such detectors. For example, a human labeler tasked with labelling objects in an image may manually mark the approximate corner of an observed sign in an image, while the true corner may be offset by a few pixels. Such errors, while they may be generally undiscernible from the context of a human observer, may manifest themselves as larger errors when such observed features are used to generate a map of the environment. Small errors in the detection may result in inaccurate reconstruction of the detector outputs when building the map. When detectors are accurate, the resulting map is accurate. This is critical in the context of HD map construction from crowd-sourced data. The methods provided herein remove the bias that may be introduced through manual labeling such that biasing errors are not propagated throughout the training data of the perception system, which could lead to large volumes of biased and inaccurate data. Thus, embodiments described herein improve the functioning of a map system provider and the associated database for accuracy and efficiency.

As described above, HD maps may be instrumental in facilitating autonomous vehicle control. Building the HD maps may rely on sensor data received from crowd sourced detectors including image sensors and depth detectors (e.g., LiDAR) from vehicles traveling along the network of roads that is mapped. The sensor data that is received is processed to identify objects and features in the sensor data to properly build and update the HD maps, and to facilitate autonomous control of the vehicle generating the sensed data. The sensors may be used to capture sensor data within which objects are present. Certain objects detected by the sensors may be critical for facilitating autonomous control of a vehicle, such as roadway boundaries, lane lines, and road signs including information contained on the road signs. Detecting these features reliably and repeatably may be instrumental in safe autonomous vehicle control.

According to example embodiments described herein, the role of HD maps in facilitating autonomous or semi-autonomous vehicle control may include crowd-sourced building of the maps to identify and confirm features and objects of the maps and their respective locations. In the context of map-making, the features from the environment may be detected by a vehicle traveling along a road segment and consolidated to form a representation of the actual real-world environment in the form of a map. Embodiments described herein include a method, apparatus, and computer program product to establish the position of features detected along a road segment accurately and repeatably through the improved efficiency with which learning data may be generated for perception systems to be able to automatically detect and locate features in an environment.

Vehicles traveling along a road segment may be equipped with sensors, such as sensors 21 of apparatus 20 of FIG. 1, where the sensors may include image sensors and distance sensors (e.g., LiDAR sensor or other three-dimensional sensor). These sensors may be used to detect features of an environment to facilitate autonomous and semi-autonomous driving. The sensors may be part of a detection module or perception module which may feature a plurality of sensors to obtain a full interpretation of the environment of the module and the vehicle associated therewith.

FIG. 5 illustrates an example embodiment of architecture specifically configured for implementing embodiments described herein. The illustrated embodiment of FIG. 5 may be vehicle-based, where sensor data is obtained from sensors of a vehicle traveling along a road segment. The location of the collected sensor data along the road segment may be determined through location determination using GPS or other locationing techniques and correlated to map data of map data service provider 108. As illustrated, the architecture includes a map data service provider 108 that provides map data (e.g., HD maps and policies associated with road links within the map) to the Advanced Driver Assistance System (ADAS) 205, which may be vehicle-based or server based depending upon application. The map data service provider may be a cloud-based 210 service. The ADAS receives navigation information and vehicle position and may use that information to map-match 215 the position to a road link on a map of the mapped network of roads stored in the map cache 220. This link or segment, along with the direction of travel, may be used to establish which HD map policies are applicable to the vehicle associated with the ADAS, including sensor capability information, autonomous functionality information, etc. Accordingly, policies for the vehicle are established based on the current location and the environmental conditions (e.g., traffic, time of day, weather, etc.). Further, signs along the road segment may be used to understand rules of operation along the road segment, and to identify changes to traffic flows which may be communicated via signs. The information from signs and their location along road segments may inform policies that govern how a vehicle is to traverse a road segment and these policies may be stored, for example, in an HD map of the region. The HD map policies associated with the road segment may be provided to the vehicle control, such as via the CAN (computer area network) BUS (or Ethernet or Flexray) 240 to the electronic control unit (ECU) 245 of the vehicle to implement HD map policies, such as various forms of autonomous or assisted driving, or navigation assistance.

A vehicle traveling along a road segment may receive sensor data from a plurality of sensors used to capture data relating to the surrounding environment. A vehicle with autonomous or semi-autonomous control may detect features in the environment of the vehicle to facilitate the autonomous or semi-autonomous control. Sensor redundancy may be used to provide additional confirmation relating to features and objects of the environment and to improve detection and reliability of vehicle interpretation of the surrounding environment. In order to implement full autonomy for a vehicle, the vehicle must be contextually aware in that the vehicle must be aware of the surroundings in terms of both dynamic conditions (e.g., weather, traffic, construction, etc.) and static conditions (e.g., road geometry, road signs, etc.). The vehicle context may be interpreted based on sensor observations that are passed through a perception module to understand the content of the observed environment. The perception module's set of detectors may correspond to deep-neural network based methods of understanding features in the environment and identifying a location of the features in the environment. Embodiments described herein include a method to improve the performance of detecting features and objects in an environment and properly locating them in the environment beyond conventional methods relying on human, manual labeling of objects.

FIG. 6 illustrates a flowchart depicting a method according to an example embodiment of the present invention. It will be understood that each block of the flowchart and combination of blocks in the flowchart may be implemented by various means, such as hardware, firmware, processor, circuitry, and/or other communication devices associated with execution of software including one or more computer program instructions. For example, one or more of the procedures described above may be embodied by computer program instructions. In this regard, the computer program instructions which embody the procedures described above may be stored by a memory device 26 of an apparatus employing an embodiment of the present invention and executed by a processor 24 of the apparatus 20. As will be appreciated, any such computer program instructions may be loaded onto a computer or other programmable apparatus (for example, hardware) to produce a machine, such that the resulting computer or other programmable apparatus implements the functions specified in the flowchart blocks. These computer program instructions may also be stored in a computer-readable memory that may direct a computer or other programmable apparatus to function in a particular manner, such that the instructions stored in the computer-readable memory produce an article of manufacture the execution of which implements the function specified in the flowchart blocks. The computer program instructions may also be loaded onto a computer or other programmable apparatus to cause a series of operations to be performed on the computer or other programmable apparatus to produce a computer-implemented process such that the instructions which execute on the computer or other programmable apparatus provide operations for implementing the functions specified in the flowchart blocks.

Accordingly, blocks of the flowchart support combinations of means for performing the specified functions and combinations of operations for performing the specified functions for performing the specified functions. It will also be understood that one or more blocks of the flowchart, and combinations of blocks in the flowchart, can be implemented by special purpose hardware-based computer systems which perform the specified functions, or combinations of special purpose hardware and computer instructions.

FIG. 6 is a flowchart of a method for generating learning data to facilitate de-biasing the labeled location of an object of interest within an image. As shown, at 510 sensor data is received from at least one image sensor, where the sensor data is representative of a first image. Reference corners of an object in the first image are determined at 520 using image processing, such as corner detection, of the first image. Observed corners of the object in the first image are generated at 530 from the determined reference corner locations. A bias transformation is generated at 540 based, at least in part, on a difference between the reference corner locations and the observed corner locations of the object in the first image. Sensor data is received from another image sensor at 550 representative of a second image. Observed corners locations of an object in the second image are received at 560 from a user who manually locates and labels the corners of the object. The bias transformation is applied to the observed corner locations of the object in the second image at 570 to generate de-biased corners for the object in the second image. A map update for the object in the second image is generated at 580 using the de-biased corners of the object, and a map database is updated at 590 with the object in the second image according to the locations of the de-biased corner locations.

In an example embodiment, an apparatus for performing the method of FIG. 6 above may comprise a processor (e.g., the processor 24) configured to perform some or each of the operations (510-590) described above. The processor may, for example, be configured to perform the operations (510-590) by performing hardware implemented logical functions, executing stored instructions, or executing algorithms for performing each of the operations. Alternatively, the apparatus may comprise means for performing each of the operations described above. In this regard, according to an example embodiment, examples of means for performing operations 510-590 may comprise, for example, the processor 24 and/or a device or circuit for executing instructions or executing an algorithm for processing information as described above.

Many modifications and other embodiments of the inventions set forth herein will come to mind to one skilled in the art to which these inventions pertain having the benefit of the trainings presented in the foregoing descriptions and the associated drawings. Therefore, it is to be understood that the inventions are not to be limited to the specific embodiments disclosed and that modifications and other embodiments are intended to be included within the scope of the appended claims. Moreover, although the foregoing descriptions and the associated drawings describe example embodiments in the context of certain example combinations of elements and/or functions, it should be appreciated that different combinations of elements and/or functions may be provided by alternative embodiments without departing from the scope of the appended claims. In this regard, for example, different combinations of elements and/or functions than those explicitly described above are also contemplated as may be set forth in some of the appended claims. Although specific terms are employed herein, they are used in a generic and descriptive sense only and not for purposes of limitation.

That which is claimed:

1. An apparatus comprising at least one processor and at least one non-transitory memory including computer program code instructions, the computer program code instructions configured to, when executed, cause the apparatus to at least:

receive observed corner locations of an object in a labeled image from a user;

use the observed corner locations of the object as an input to a deep neural network auto-encoder framework;

receive from the deep neural network auto-encoder framework de-biased corner locations of the object, wherein de-biased corner locations comprise the observed corner locations transformed by a bias transformation;

determine distances between the de-biased corner locations of the object and corresponding observed corner locations of the object; and provide an alert to the user in response to at least one distance of the distances being greater than a predefined distance, wherein the alert prompts a review of the labeled image for quality.

2. The apparatus of claim 1, wherein in response to no distance of the distances being greater than the predefined distance, the apparatus is further caused to:

generate or update the bias transformation based, at least in part, on differences between the observed corner locations and the de-biased corner locations of the object.

3. The apparatus of claim 1, wherein in response to no distance of the distances being greater than the predefined distance, the apparatus is further caused to incorporate the observed corner locations of the object in the labeled image as training data to the deep neural network auto-encoder framework.

4. The apparatus of claim 3, wherein in response to no distance of the distances being greater than the predefined distance, the apparatus is further caused to:
  generate a map update for the object in the labeled image using the de-biased corner locations of the object; and
  cause a map database to be updated with the object in the labeled image according to the de-biased corners locations of the object.

5. The apparatus of claim 4, wherein the object in the labeled image comprises a road sign proximate a road segment, wherein the apparatus is further caused to:
  provide for autonomous control of a vehicle based, at least in part, on the map update of the object in the labeled image.

6. The apparatus of claim 5, wherein the object in the labeled image comprises information associated with driving restrictions along the road segment, wherein causing the apparatus to provide for autonomous control of the vehicle based, at least in part, on the map update of the object in the labelled image comprises causing the apparatus to provide autonomous control of the vehicle along the road segment based on the driving restrictions of the road sign.

7. The apparatus of claim 1, wherein the apparatus is further caused to train the deep neural network auto-encoder framework by causing the apparatus to:
  receive image data including an object captured in the image data;
  determine reference corner locations of the object within the image data;
  apply a warping function to the reference corner locations of the object to generate artificial corner locations; and
  train a deep neural network auto-encoder framework using the reference corner locations and the artificial corner locations to establish a transformation between the reference corner locations and the artificial corner locations.

8. The apparatus of claim 7, wherein the apparatus is further caused to:
  receive input in the form of manually labeled corner locations of a new object within a new image;
  apply the deep neural network auto-encoder framework to the manually labeled corner locations of the new object within the new image; and
  determine, from the deep neural network auto-encoder framework, new de-biased corner locations corresponding to the new object within the new image.

9. The apparatus of claim 1, wherein the predefined distance comprises a predefined distance based, at least in part, on a size of the object in the labeled image.

10. A computer program product comprising at least one non-transitory computer-readable storage medium having computer-executable program code instructions stored therein, the computer-executable program code instructions comprising program code instructions to:
  receive observed corner locations of an object in a labeled image from a user;
  use the observed corner locations of the object as an input to a deep neural network auto-encoder framework;
  receive from the deep neural network auto-encoder framework de-biased corner locations of the object, wherein de-biased corner locations comprise the observed corner locations transformed by a bias transformation;
  determine distances between the de-biased corner locations of the object and corresponding observed corner locations of the object; and
  provide an alert to the user in response to at least one distance of the distances being greater than a predefined distance, wherein the alert prompts a review of the labeled image for quality.

11. The computer program product of claim 10, further comprising program code instructions to, in response to no distance of the distances being greater than the predefined distance:
  generate or update the bias transformation based, at least in part, on differences between the observed corner locations and the de-biased corner locations of the object.

12. The computer program product of claim 10, further comprising program code instructions to, in response to no distance of the distances being greater than the predefined distance, incorporate the observed corner locations of the object in the labeled image as training data to the deep neural network auto-encoder framework.

13. The computer program product of claim 12, further comprising program code instructions to, in response to no distance of the distances being greater than the predefined distance:
  generate a map update for the object in the labeled image using the de-biased corner locations of the object; and
  cause a map database to be updated with the object in the labeled image according to the de-biased corners locations of the object.

14. The computer program product of claim 13, wherein the object in the labeled image comprises a road sign proximate a road segment, wherein the computer program product further comprises program code instructions to:
  provide for autonomous control of a vehicle based, at least in part, on the map update of the object in the labeled image.

15. The computer program product of claim 14, wherein the object in the labeled image comprises information associated with driving restrictions along the road segment, wherein the program code instructions to provide for autonomous control of the vehicle based, at least in part, on the map update of the object in the labelled image comprise program code instructions to provide autonomous control of the vehicle along the road segment based on the driving restrictions of the road sign.

16. The computer program product of claim 10, further comprising program code instructions to train the deep neural network auto-encoder framework using program code instructions to:
  receive image data including an object captured in the image data;
  determine reference corner locations of the object within the image data;
  apply a warping function to the reference corner locations of the object to generate artificial corner locations; and
  train a deep neural network auto-encoder framework using the reference corner locations and the artificial corner locations to establish a transformation between the reference corner locations and the artificial corner locations.

17. The computer program product of claim 16, further comprising program code instructions to:
  receive input in the form of manually labeled corner locations of a new object within a new image;
  apply the deep neural network auto-encoder framework to the manually labeled corner locations of the new object within the new image; and determine, from the deep neural network auto-encoder framework, new de-biased corner locations corresponding to the new object within the new image.

18. The computer program product of claim 10, wherein the predefined distance comprises a predefined distance based, at least in part, on a size of the object in the labeled image.

19. A method comprising:
receiving observed corner locations of an object in a labeled image from a user;
using the observed corner locations of the object as an input to a deep neural network auto-encoder framework;
receiving from the deep neural network auto-encoder framework de-biased corner locations of the object, wherein de-biased corner locations comprise the observed corner locations transformed by a bias transformation;
determining distances between the de-biased corner locations of the object and corresponding observed corner locations of the object; and
providing an alert to the user in response to at least one distance of the distances being greater than a predefined distance, wherein the alert prompts a review of the labeled image for quality.

20. The method of claim 19, wherein in response to no distance of the distances being greater than the predefined distance, the method further comprises:
generating or updating the bias transformation based, at least in part, on differences between the observed corner locations and the de-biased corner locations of the object.

\* \* \* \* \*